United States Patent
Miwa et al.

(12) 
(10) Patent No.: US 6,300,446 B1
(45) Date of Patent: Oct. 9, 2001

(54) FLUORINE-CONTAINING COPOLYMER AND COMPOSITION THEREOF

(75) Inventors: Tetsuya Miwa; Masayuki Saito; Junichi Nakamura; Makoto Honda, all of Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/646,123

(22) PCT Filed: Mar. 30, 1999

(86) PCT No.: PCT/JP99/01628

§ 371 Date: Sep. 28, 2000

§ 102(e) Date: Sep. 28, 2000

(87) PCT Pub. No.: WO99/50321

PCT Pub. Date: Oct. 7, 1999

(30) Foreign Application Priority Data

Mar. 31, 1998 (JP) .................................................. 10-087043

(51) Int. Cl.$^7$ .................. C08F 214/26; C08F 214/18; C08F 214/20; C08F 214/22

(52) U.S. Cl. ................. 526/250; 526/242; 526/247; 526/250; 526/255; 526/345; 526/351; 526/352

(58) Field of Search ........................... 526/250, 247, 526/255, 345, 351, 352

(56) References Cited

U.S. PATENT DOCUMENTS

| | | | | |
|---|---|---|---|---|
| 4,277,586 | * | 7/1981 | Ukihashi | 526/93 |
| 4,713,418 | * | 12/1987 | Logothetis | 525/200 |
| 5,677,389 | * | 10/1997 | Logothetis | 525/340 |

FOREIGN PATENT DOCUMENTS

| | | |
|---|---|---|
| 57-164142 | 10/1982 | (EP) . |
| 63-289008 | 11/1988 | (JP) . |
| 8-169917 | 7/1996 | (JP) . |
| 10-36454 | 2/1998 | (JP) . |

* cited by examiner

*Primary Examiner*—Fred Zitomer
(74) *Attorney, Agent, or Firm*—Oblon, Spivak, McClelland, Maier & Neustadt, P.C.

(57) ABSTRACT

A fluorine-containing copolymer characterized by comprising tetrafluoroethylene, vinyl fluoride or vinyl chloride and a polymerizable compound other than the above, and a vulcanizable composition comprising the fluorine-containing copolymer, a vulcanizing agent, an acid-receiving agent and a vulcanization accelerator.

8 Claims, No Drawings

FLUORINE-CONTAINING COPOLYMER AND COMPOSITION THEREOF

TECHNICAL FIELD

The present invention relates to a novel fluorine-containing copolymer having good vulcanizability, and a molded product having good heat resistance and oil resistance, which is obtained by vulcanizing a vulcanizable composition containing it.

BACKGROUND ART

Fluorine rubber is preferably employed for automobile parts such ag oil seals, as a rubber excellent in oil resistance. However, along with the trend for high performance of engine oil, durability of an engine oil having an amine type additive incorporated in a large amount has become an important subject. A vulcanizate of copolymer having VdF copolymerized, such as a am hexafluoropropylene (hereinafter referred to as HFP)/vinylidene fluoride (hereinafter referred to as VdF) polymer, a HFP/VdF/ tetrafluoroethylene (hereinafter referred to as TFE) copolymer or a TFE/propylene/VdF copolymer, has been poor in engine oil resistance, and a vulcanizate of a TFE/propylene copolymer is excellent in engine oil resistance, but has had a problem that it is inferior in vulcanizability.

DISCLOSURE OF THE INVENTION

The present invention has an object to provide a fluorine-containing copolymer excellent in vulcanizability, a vulcanizdble Composition containing such a copolymer, and a molded product excellent in heat resistance and oil resistance, which can be obtained by vulcanizing the composition.

BEST MODE FOR CARRYING OUT THE INVENTION

The present invention provides a fluorine-containing copolymer which comprises from 30 to 70 mol % of polymer units based on (A) TFE, from 0.1 to 40 mol % of polymer units based on (B) at least one member selected from the group consisting of vinyl fluoride (hereinafter referred to ag VF) and vinyl chloride (hereinafter referred to as VC) and from 20 to 69.9 mol % of polymer units based on (C) a polymerizable compound other than (A) and (B), and which has a Mooney viscosity $ML_{1+10}$ (100° C.) of from 10 to 200 as an index of the molecular weight.

Further, it provides a vulcanizable composition comprising (D) the above mentioned fluorine-containing copolymer, (E) a vulcanizing agent, (F) an acid-receiving agent and (G) a vulcanization accelerator.

The proportion of polymer units based on TFE of component (A) is from 30 to 70 mol %, preferably from 35 to 65 mol %. If it is less than 30 mol %, the fluorine content in the copolymer is low, whereby the heat resistance and oil resistance of the vulcanizate tend to be inferior, and if it exceeds 70 mol %, the function of the vulcanizate as a rubber elastic body tends to deteriorate. The polymer units based on VF or VC of component (B) will serve as vulcanization sites, and their proportion is from 0.1 to 40 mol %, preferably from 0.5 to 15 mol %, more preferably from 0.5 to 10 mol %. If it is less than 0.1 mol %, the vulcanizability tends to be inadequate, and if it exceeds 40 mol %, the heat resistance or oil resistance of the obtained vulcanizate tends to be low.

The proportion of the polymer units based on the polymerizable compound of component (C) is from 20 to 69.9 mol %, preferably from 30 to 65 mol %.

The polymerizable compound (C) may, for example, be a fluorine-containing olefin, a fluorine-containing vinyl ether, an alkyl vinyl ether or a hydrocarbon type olefin. At least one member selected therefrom will be copolymerized.

The fluorine-containing olefin may specifically be, for example, VdF, HFP, pentafluoropropylene, trifluoroethylene or chlorotrifluoroethylene.

The fluorine-containing vinyl ether is not particularly limited, but it may, for example, be preferably a perfluorovinyl ether represented by a general formula of $CF_2=CFO(CF_2CFXO)_nR^f$ (wherein $R^f$ is a $C_{1-12}$ perfluoroalkyl group, X is a fluorine atom or a trifluoromethyl group, and n is an integer of from 0 to 6). In the general formula, it is preferred that $R^f$ is a $C_{1-5}$ perfluoroalkyl group, n is from 0 to 3, and X is a trifluoromethyl group, from the viewpoint of easy vailability. specifically, $CF_2=CFOCF_3$, $CF_2=CFOC_2F_5$, $CF_2=CFOC_3F_7$, $CF_2=CFOC_5F_{11}$ or $CF_2=CFOCF_2CF(CF_3)OC_3F_7$, may, for example, be mentioned.

Further, a fluorine-containing vinyl ether which is not perfluorinated, such as $CF_2=CFO(CF_2)pH$ [wherein p is an integer of from 2 to 8] or $CF_2=CFOCH_2(CF_2)_qF$ [wherein q is an integer of from 1 to 7], may also be employed.

Particularly, perfluorovinyl ether is preferably employed.

The alkyl vinyl ether may be represented by a general formula of $CH_2=CHOR$ (wherein R is an alkyl group or a cycloalkyl group). The alkyl vinyl ether is preferably one having the above general formula wherein R is a $C_{1-6}$ alkyl group or a $C_{3-6}$ cycloalkyl group, and R may be straight chained, branched or cyclic.

Specifically, methyl vinyl ether, ethyl vinyl ether, n-propyl vinyl ether, n-butyl vinyl ether, isopropyl vinyl ether, isobutyl vinyl ether or cyclohexyl vinyl ether, may, for example, be mentioned.

The hydrocarbon type olefin is not particularly limited. However, in the present invention, ethylene, propylene or isobutylene is preferred which has a small chain transfer constant. Further, in the fluorine-containing copolymer of the present invention, as one type of (C), vinyl acetate, vinyl chloroacetate, chloroethyl vinyl ether, glycidyl vinyl ether or allyl glycidyl ether may, for example, be copolymerized.

The fluorine-containing copolymer of the present invention has a Mooney viscosity $ML_{1+10}$ (100° C.) of from 10 to 200, preferably from 15 to 150, as an index of the molecular weight. If the Mooney viscosity is outside this range, the function of the vulcanizate as a rubber elastic body tends to deteriorate.

For the production of the fluorine-containing copolymer of the present invention, conventional polymerization methods may be employed. Specifically, in bulk polymerization, suspension polymerization, emulsion polymerization or solution polymerization, a catalytic polymerization method employing a polymerization initiator such as a peroxide or an azo compound, an ionizing radiation polymerization method or a redox type polymerization method may, for example, be optionally carried out.

The copolymerization can be carried out in an organic solvent such as a fluorine-containing hydrocarbon type solvent such as $CF_3CCl_2F$, $CClF_2CF_2CHClF$, $CF_3CF_2CHFCHFCF_3$, $F(CF_2)_6H$, $F(CF_2)_6F$ or $C_4F_9CH_2CH_3$ or an alcohol type solvent such as t-buthanol, $CF_3CH_2OH$ or $C_4F_9CH_2CH_2OH$.

As the polymerization temperature, a temperature of from −40° C. to +150° C. may be employed, and as the polymerization pressure, a relatively low pressure of from 1 to 50 kg/cm² may be employed. Further, using an queous medium, suspension polymerization or emulsion olymerization may be carried out.

In the emulsion polymerization, an anionic emulsifier such as a perfluorocarboxylic acid salt, an alkyl benzene sulfonic acid salt, an alkyl naphthalene sulfonic acid salt, an alkyl ether sulfuric acid ester or a phosphoric acid ester, and a nonionic emulsifier such as an alkyl phenol ethylene oxide adduct, a higher alcohol ethylene oxide adduct or an ethylene oxide/propylene oxide block copolymer, may preferably be employed.

In the suspension polymerization or the emulsion polymerization, a reaction accelerator, a dispersion stabilizer such as methyl cellulose, polyvinyl alcohol, liquid paraffin or t-buthanol, or the like, may suitably be employed, and further, control of the molecular weight may optionally be carried out by employing a chain transfer agent such as acetone, isopropyl alcohol, sec-buthanol, methanol, diethyl malonate or tetrahydrofuran. Further, a polymerization initiator such as a peroxide, an azo compound or a persulfate may be employed, or the copolymerization reaction may be carried out by radiation of ionizing radiation such as γ-ray from $^{60}$Co.

The polymerization in an aqueous medium can be carried out, for example, at a temperature of from 50 to 100° C. under a pressure of from 5 to 200 kg/cm². Otherwise, the polymerization can be carried out at a lower temperature of from −20° C. to +50° C. by using e.g. a redox type polymerization initiator. Further, the olymerization in the present invention can be carried out by an optional operation such as a batch system, a semicontinuous system or a continuous system, and it is advisable to select various polymerization conditions, polymerization procedure, polymerization apparatus, etc., depending upon the purpose or the employed polymerization system, etc.

In the present invention, the formed fluorine-containing copolymer can be separated by a suitable means after the polymerization. For example in the emulsion polymerization method, separation and purification can be carried out by a coagulation method wherein an electrolyte is added to the polymer latex after completion of the polymerization reaction or a method wherein centrifugal separation or filtration is carried out after freezing, and then the copolymer is washed and dried.

The copolymer of the present invention can be vulcanized by e.g. an organic peroxide or a polyhydroxy compound. When vulcanization is carried out by means of an organic peroxide, good vulcanization properties can be obtained, and a vulcanizate having good physical properties can be obtained, even if readily vulcanizable sites commonly employed for peroxide vulcanization of fluorinated rubber have not been introduced into the copolymer. Further, the copolymer of the present invention may contain readily vulcanizable sites. Here, the readily vulcanizable sites mean bromine, iodine, double bonds, etc., introduced into the polymer chain. Such readily vulcanizable sites can be usually introduced by copolymerizing a monomer capable of imparting readily vulcanizable sites (such as an iodine compound, a bromine compound or a diolefin compound) or by carrying out post treatment (such as heat treatment or alkali treatment in the presence of an onium salt) capable of imparting readily vulcanizable sites.

The fluorine-containing copolymer (D) of the present invention is preferably vulcanized by incorporating an organic peroxide or a polyhydroxy compound as the vulcanizing agent (E), at least one member selected from a bivalent metal hydroxide and a bivalent metal oxide as the acid-receiving agent (F) and at least one member selected from an organic base and an organic onium salt as the vulcanization accelerator (G).

The organic peroxide is an organic compound which has a peroxy bond and which is used as the vulcanizing agent (E), and a peroxy ketal, a dialkyl peroxide, a diacyl peroxide, a peroxy ester or a hydroperoxide may, for example, be employed. Specifically, benzoyl peroxide, dicumyl peroxide, di-t-butyl peroxide, 2,5-dimethyl-2,5-bis(t-butylperoxy)hexane, 2,5-dimethyl-2,5-bis(t-butylperoxy) hexyne-3, α, α'-bis(t-butylperoxy)-m-diisopropylbenzene, 1,1-bis(t-butylperoxy)-3,3,5-trimethylcyclohexane, di-t-butylperoxy isophthalate or t-butyl hydroperoxide may, for example, be mentioned. These peroxides may be used alone or as a mixture of two or more of them. particularly preferred is α, α'-bis(t-butylperoxy)-m-diisopropylbenzene or 2,5-dimethyl-2,5-bis(t-butylperoxy)hexane.

Such an organic peroxide is used in an amount of from 0.5 to 10 parts by weight, preferably from 1 to 5 parts by weight, per 100 parts by weight of the fluorine-containing copolymer.

When an organic peroxide is employed, a compound having at least two unsaturated bonds, such as a polyallyl compound, a dimethacrylate compound, a divinyl compound or a polybutadiene, may be employed as a vulcanization co-agent. Particularly preferred is a polyallyl compound such as triallyl isocyanurate or triallyl cyanurate. Such vulcanization co-agents may be used alone or as a mixture of two or more of them, and used in an amount of from 0.5 to 20 parts by weight, preferably from 1 to 10 parts by weight, per 100 parts by weight of the fluorine-containing copolymer.

Further, the polyhydroxy compound is used as the vulcanizing agent (E), and bisphenol A, bisphenol AF, 1,3,5-hydroxy benzene, 1,7-dihydroxy naphthalene, 2,7-dihydroxy naphthalene, 1,6-dihydroxy naphthalene, 4,4'-dihydroxy biphenyl, catechol, 4,4'-dihydroxy stilbene, 2,6-dihydroxy anthracene, hydroquinone, 4,4'-dihydroxy diphenyl sulfone, 2,2'-dihydroxy benzophenone, tris(4-hydroxyphenyl)methane, 2,2,3,3,4,4-hexafluoropentane-1, 5-diol, polyethylene glycol or ethylene glycol, may, for example, be mentioned. These agents may be used alone or as a mixture of two or more of them. The amount is from 0.1 to 10 parts by weight, preferably from 0.5 to 5 parts by weight, per 100 parts by weight of the fluorine-containing copolymer. Further, they may be alkali metal salts or alkaline earth metal salts.

The bivalent metal hydroxide or the bivalent metal oxide is used as the acid-receiving agent (F), and a hydroxide or oxide of magnesium, calcium, lead, zinc or the like, may be mentioned. These may be used alone or as a mixture of two or more of them. The amount is from 1 to 50 parts by weight, preferably from 2 to 30 parts by weight, per 100 parts by weight of the fluorine-containing copolymer.

The organic base or the organic onium salt is used as a vulcanization accelerator (G) which accelerates a dehydrogen fluoride reaction or a dehydrogen chloride reaction from VF or VC sites of the fluorine-containing copolymer during vulcanization to let vulcanization proceed smoothly. An amine compound, a phosphine compound, an organic phosphonium halide, an organic phosphonium benzo triazolate, an organic ammonium halide, an organic ammonium hydroxide, an organic ammonium bisulfate or an organic acid salt of 1,8-azabicyclo[5.4.0]undecene-7 is preferably employed.

The amine compound may, for example, be tributylamine, benzylamine, diphenylamine, triphenylamine, or 1,8-diazabicyclo [5.4.0] undecene-7.

The phosphine compound may, for example, be tributylphosphine, trioctylphosphine or triphenylphosphine.

The organic phosphonium halide may, for example, be tetramethylphosphonium chloride, tetraethylphosphonium chloride, tetrapropylphosphonium chloride, tetrabutylphosphonium chloride, tributylhexadecyl chloride, benzyltributylphosphonium chloride, methyltrioctylphosphonium chloride, ethyltrioctylphosphonium chloride, benzyltriphenyl-phosphonium chloride, tributyl (methoxypropyl)phosphonium chloride, benzyldiethylaminodiphenylphosphonium chloride, tetramethylphosphonium bromide, tetramethylphosphonium bromide, tetrapropylphosphonium bromide, tetrabutylphosphonium bromide, tributylhexadecylphosphonium bromide, benzyltributylphosphonium bromide, ethyltrioctylphosphonium bromide or benzyltriphenylphosphonium bromide.

The organic phosphonium benzotriazolate may, for example be tetrabutylphosphonium benzotriazolate, tetraoctylphosphonium benzotriazolate, methyltrioctylphosphonium benzotriazolate, butyltrioctylphosphonium benzotriazolate, tributylphenylphosphonium benzotriazolate, benzyltributylphosphonium benzotriazolate, benzyltricyclohexylphosphonium benzotriazolate, benzyltrioctylphosphonium benzotriazolate, butyltriphenylphosphonium benzotriazolate, octyltriphenylphosphonium benzotriazolate, benzyltriphenylphosphonium benzotriazolate, tetraphenyiphosphonium benzotriazolate, tepbis(diethylamino)diphenyiphosphonium benzotriazolate, benzylbis(dimethylamino)phenylphosphonium benzotriazolate, benzylbis (diethylamino) phenylphosphonium benzotriazolate, tributyl(2,2,2-trifluoroethyl)phosphonium benzotriazolate or phosphonium tolyl triazolate.

The organic ammonium halide may, for example, be tetramethylammonium chloride, tetraethylammonium chloride, tetrapropylammonium chloride, tetrabutylammonium chloride, hexadecyltributylammonium chloride, benzyltributylammonium chloride, trioctylethylammonium chloride, tetramethylammonium bromide, tetraethylammonium bromide, tetrapropylammonium bromide, tetrabutylammonium bromide, hexadecyltributylammonum bromide, benzyltributylammonium bromide or trioctylethylammonium bromide.

The organic ammonium hydroxide may, for example, be tetrabutylammonium hydroxide, tetramethylammonium hydroxide, tetraethylammonium hydroxide, trioctylmethylammonium hydroxide, tridodecylmethylammonium hydroxide or trimethylbenzylammonium hydroxide.

The organic ammonium bisulfate may, for example, be tetrabutylammonium bisulfate, tetramethylammonium bisulfate, tetraethylammonium bisulfate, trioctylmethylammonium bisulfate or benzyltrimethylammonium bisulfate.

The organic salt of 1,8-diazabicyclo[5.4.0]undecene-7 may, for example, be a p-toluene sulfonate of 1,8-diazabicyclo[5.4.0]undecene-7 or an octanoate of 1,8-diazabicyclo[5.4.0]undecene-7. These may be used as dispersed or dissolved in a suitable solvent such as water or an alcohol.

The vulcanization accelerator (G) is used in an amount of from 0.1 to 10 parts by weight, preferably from 0.5 to 3 parts by weight, per 100 parts by weight of the fluorine-containing copolymer, and two or more may be used in combination. If it is less than 0.1 part by weight, no adequate vulcanization density and physical properties of the vulcanizate tend to be obtained, and if it exceeds 10 parts by weight, a scorching phenomenon or the like tens to take place, whereby the molding processability tends to deteriorate, or the chemical resistance, etc., of the vulcanizate tend to deteriorate.

Further, to the composition of the present invention, various activators for vulcanization acceleration may be incorporated in order to increase the effect of the vulcanization accelerator, as the case requires. As such vulcanization acceleration activators, sulfone compounds such as sulfolane or dichlorodiphenylsulfone, may be mentioned.

Further, to the composition of the present invention, a reinforcing agent such as carbon black, fine silica, clay or talc, which is commonly used for the production of vulcanized rubber, other fillers, pigment, antioxidant, stabilizer, vulcanization-retarder, processing co-agent or internal releasing agent, may be added or incorporated.

The vulcanizable composition is preferably prepared by adequately uniformly mixing it by means of a kneading machine for usual rubber, such as a 2-roll, a kneader or an extruder. The obtained vulcanizable composition may be molded into a molded product such as a sheet, a pipe, a rod, a tube, an angle, a channel, a coated cloth or a coated plate by usual molding by means of a mold, or a continuous mold processing method such as extrusion, transfer, roll coating, brush coating or impregnation. And by other various molding methods, it may be molded into a special shape or a special molded product, such as a sponge-like rubber.

As an operation for vulcanizing the fluorine-containing copolymer of the present invention, an operation which is commonly used for vulcanization of rubber, may be employed. For example, an operation of heating under pressure in a mold may be employed, or an operation of molding by e.g. extrusion or calender roll, followed by heating in a hot oven or a steam oven, may be employed. As a vulcanization condition, heating at a temperature of from 100 to 400° C. for from a few seconds to a few hours, may be employed as the case requires. Further, such a vulcanizate may be subjected to secondary vulcanization. The secondary vulcanization may be carried out at a temperature of from 100 to 300° C. for a few minutes to a few tens hours.

Now, the present invention will be described in detail with reference to Examples (Examples 1 to 12, 16 and 17) and Comparative Examples (Examples 13 to 15), but the present invention is not thereby limited.

Further, in the following, parts means parts by weight, and a Fe/EDTA aqueous solution means an aqueous solution having 0.39 g of $FeSO_4.7H_2O$ and 0.31 g of disodium ethylene diaminetetraacetate-dihydrate dissolved in 40 g of water, and a catalyst solution means an aqueous solution obtained by dissolving 60 g of $NaHSO_2$ $HCHO.2H_2O$ (a formaldehyde derivative of mono sodium sulfoxylate) and 30 g of NaOH as catalysts in 210 g of water, followed by nitrogen bubbling.

EXAMPLE 1

To an autoclave having an internal capacity of 3 l, 1600 g of deionized water, 141 g of t-buthanol, 13 g of ammonium perfluorooctanoate, 19 g of ammonium persulfate, 37 g of $Na_2HPO_4.12H_2O$ and 4.1 g of sodium hydroxide were charged, then, a Fe/EDTA aqueous solution was added, nitrogen substitution and deaeration of the system were repeated three times, and then 160 g of TFE, 8 g of propylene and 13 g of VF were injected.

The temperature of the autoclave was adjusted to 25° C., and then, a catalyst solution was charged at a rate of 10 ml/hr by a feed pump to initiate polymerization. While maintaining the temperature of the autoclave at 25° C., if the pressure decreased to 24,5 kg/cm²G by polymerization, a mixed gas of TFE/propylene/VF=51/43.5/5.5 (mol %) was added to maintain the pressure at 25 kg/cm²G. This procedure was repeated, and the polymerization reaction was carried out for 8 hours. Supply of the catalyst solution was terminated, and the unreacted monomer was purged to terminate the copolymerization reaction.

The obtained formed latex was added to a 10% NaCl aqueous solution and coagulated, and it was further sufficiently washed with water and then dried to obtain 790 g of a copolymer having a specific gravity of 1.52 and a Mooney viscosity [$ML_{1+10}$ (100° C.)] of 130. the obtained copolymer (hereinafter referred to as copolymer 1) was subjected to elemental analysis and NMR analysis, whereby polymer units based on TFE were 52 mol %, polymer units based on propylene were 43 mol %, and polymer units based on VF were 5 mol %.

To 100 parts of copolymer 1, 25 parts of MT carbon black, 1 part of Percadox 14 (tradename, α, α'-bis(t-butylperoxy)-m-diisopropylbenzene, manufactured by Nippon Yushi K.K.), 5 parts of triallyl isocyanurate (hereinafter referred to as TAIC), 3 parts of Kyowamag 150 (tradename, magnesium oxide, manufactured by Kyowa Chemical Industries Company Limited) and 2.5 parts of a 40% tetrabutylammonium hydroxide/methanol solution, were kneaded for about 15 minutes on a water-cooling type 6 inch mixing roll, and then, the mixture was press-vulcanized at 170° C. for 20 minutes and then subjected to secondary vulcanization for 4 hours in an oven of 200° C.

With respect to the obtained vulcanizate, in accordance with JIS K6301, the hardness (spring hardness: in accordance with JIS A), the 100% modulus (kg.f/cm²), the tensile strength (kg.f/cm²), the elongation (%) and the compression set (%) (200° C., 70 hours) were measured as normal physical properties, the hardness change (degree), the tensile strength change (%) and the elongation change (%) were measured as the heat resistance (230° C., 70 hours), and the hardness change (degree), the tensile strength change (%), the elongation change (%) and the volume change (%) were measured as the oil resistance (oil: Toyota Castle Clean SG, 175° C., 70 hours). The results are shown in Table 1. Further, abbreviations used in Tables 1 and 2 are shown in Table 3.

EXAMPLE 2

To an autoclave having an internal capacity of 3 l, 1600 g of deionized water, 141 g of t-buthanol, 13 g of ammonium perfluorooctanoate, 19 g of ammonium persulfate, 37 g of $Na_2HPO_4 \cdot 12H_2O$, 4.1 g of sodium hydroxide and 27 g of ethyl vinyl ether (hereinafter referred to as EVE) were charged, then a Fe/EDTA aqueous solution was added, nitrogen substitution and deaeration of the system were repeated three times, and then, 160 g of TFE, 8 g of HFP and 13 g of VF were injected.

The temperature of the autoclave was adjusted to 25° C., and then, a catalyst solution was charged at a rate of 10 ml/hr by a feed pump to initiate polymerization. While maintaining the temperature of the autoclave at 25° C., if the pressure decreased to 24,5 kg/cm²G by polymerization, a mixed gas of TFE/HFP/VF=82/8/1.0 (mol %) was added to maintain the pressure at 25 kg/cm²G, and further, 8 g of EVE was added every time when 20 g of this mixed gas monomer was added. This procedure was repeated, and the polymerization reaction was carried out for 8 hours. Supply of the catalyst solution was terminated, and the unreacted monomer Wds purged to terminate the copolymerization reaction.

The obtained formed latex was added to a 10% NaCl aqueous solution and coagulated, and it was further thoroughly washed with water and then dried to obtain 780 g of a copolymer having a specific gravity of 1.50 and a Mooney viscosity [$ML_{1+10}$ (100° C.)] of 115. The obtained copolymer (hereinafter referred to as copolymer 2) was subjected to elemental analysis and NMR analysis, whereby polymer units based on TFE were 51 mol %, polymer units based on HFP were 3 mol %, polymer units based on EVE were 39 mol %, and polymer units based on VF were 7 mol %.

With respect to copolymer 2, blending and A vulcanization were carried out in the sam manner as in Example 1, and the obtained vulcanizate was evaluated.

The results are shown in Table 1.

EXAMPLE 3

To an autoclave having an internal capacity of 3 l, 1600 g of deionized water, 141 g of t-buthanol, 13 g of ammonium perfluorooctanoate, 19 g of ammonium persulfate, 37 g of $Na_2HPO_4 \cdot 12H_2O$, 4.1 g of sodium hydroxide were charged, then, a Fe/EDTA aqueous solution were added, and nitrogen substitution and deaeration of the system were repeated three times. Then, 260 g of perfluoro(propyl vinyl ether) (hereinafter referred to as PPVE) was charged under reduced pressure, and 90 g of TFE, 10 g of ethylene and 13 g of VF were injected.

The temperature of the autoclave was adjusted to 25° C., and then, a catalyst solution was charged at a rate of 10 ml/hr by a feed pump to initiate polymerization. While maintaining the temperature of the autoclave at 25° C., if the pressure decreased to 18 kg/cm²G by polymerization, a mixed gas of TFE/ethylene/VF=83/6/11 (mol %) was added to maintain the pressure at 25 kg/cm²G, and 23 g of PPVE was added every time when 20 g of this mixed gas was added. This procedure was repeated, and the polymerization reaction was carried out for 4.5 hours. Supply of the catalyst solution was terminated, and the unreacted monomer was purged to terminate the copolymerization reaction.

The obtained formed latex was added to a 10% NaCl aqueous solution and coagulated, and it was further thoroughly washed with water and then dried to obtain 600 g of a copolymer having a specific gravity of 1.96 and a Mooney viscosity [$ML_{1+10}$ (100° C.)] of 120. The obtained copolymer (hereinafter referred to as copolymer 3) was subjected to elemental analysis and NMR analysis, whereby polymer units based on TFE were 58 mol %, polymer units based on PPVE were 28 mol %, polymer units based on ethylene were 5 mol %, and polymer units based on VF were 9 mol %.

With respect to copolymer 3, blending and vulcanization were carried out in the same manner as in Example 1, and the obtained vulcanize was evaluated. The results are shown in Table 1.

EXAMPLE 4

To dn autoclave having an internal capacity of 3 l, 1600 g of deionized water, 141 g of t-buthanol, 13 g of ammonium perfluorooctanoate, 19 g of ammonium persulfate, 37 g of $Na_2HPO_4 \cdot 12H_2O$, 4.1 g of sodium hydroxide and 27 g of EVE were charged, then, a Fe/EDTA aqueous solution was added, and nitrogen substitution and deaeration of the system were repeated three times. Then, 163 g of TFE and 13 g of VF were injected.

The temperature of the autoclave was adjusted to 25° C., and then the catalyst solution was charged at a rate of 10 ml/hr by a feed pump to initiate polymerization. While maintaining the temperature of the autoclave at 25° C., if the pressure decreased to 24 kg/cm²G by polymerization, a mixed gas of TFE/VF=88/12 (mol %) was added to maintain the pressure at 24.5 kg/cm²G, and 9 g of EVE was added every time when 20 g of the mixed gas was added. This procedure was repeated, and the polymerization reaction was carried out for 7.5 hours. Supply of the catalyst solution was terminated, and the unreacted monomer was purged to terminate the copolymerization reaction.

The obtained formed latex was added to a 10% NaCl aqueous solution and coagulated, and it was further thoroughly washed with water and then dried to obtain 765 g of a copolymer having a specific gravity of 1.52 and a Mooney viscosity [$ML_{1+10}$ (100° C.)] of 105. The obtained copolymer (hereinafter referred to as copolymer 4) was subjected to elemental analysis and NMR analysis, whereby polymer units based on TFE were 52 mol %, polymer units based on EVE were 41 mol %, and polymer units based on VF were 7 mol %.

With respect to copolymer 4, blending and vulcanization were carried out in the same manner as in Example 1, and the obtained vulcanize was evaluated. The results are shown in Table 1.

EXAMPLE 5

To an autoclave having an internal capacity of 3 l, 1600 g of deionized water, 141 g of t-buthanol, 13 g of ammonium perfluorooctanoate, 19 g of ammonium persulfate, 37 g of $Na_2HPO_4.12H_2O$ and 4.1 g of sodium hydroxide were charged, then, a Fe/EDTA aqueous solution was added, nitrogen substitution and deaeration of the system were repeated three times, and then, 160 g of TFE, 8 g of propylene and 10 g of VC were injected.

The temperature of the autoclave was adjusted to 25° C., and then a catalyst solution was charged at a rate of 10 ml/hr by a feed pump to initiate polymerization. While maintaining the temperature of the autoclave at 25° C., if the pressure decreased to 22.5 kg/cm²G by polymerization, a mixed gas comprising TFE/propylene/VC=55/43.5/11.5 (mol %) was added to maintain the pressure at 25 kg/cm²G. This procedure was repeated, and the polymerization reaction was carried out for 16 hours. Supply of the catalyst solution was terminated, and the unreacted monomer was purged to terminate the copolymerization reaction.

The obtained formed latex was added to a 10% NaCl aqueous solution and coagulated, and further it was thoroughly washed with water and then dried to obtain 480 g of a copolymer having a specific gravity of 1.53 and a Mooney viscosity [$ML_{1+10}$ (100° C.)] of 30. The obtained copolymer (hereinafter referred to as copolymer 5) was subjected to elemental analysis and NMR analysis, whereby polymer units based on TFE were 55 mol %, polymer units based on propylene were 44 mol %, and polymer units based on VC were 1 mol %.

With respect to copolymer 5, blending and vulcanization were carried out in the same manner as in Example 1, and the obtained vulcanize was evaluated. The results are shown in Table 1.

EXAMPLES 6 to 10

With respect to copolymer 1, blending as shown in Table 1 or 2 was carried out, and vulcanization was carried out under the same conditions as in Example 1. The obtained vulcanizate was evaluated. The results are shown in Table 1 or 2.

EXAMPLES 11 and 12

With respect to Example 11, the same blending as in Example 1 was carried out, and with respect to Example 12, the same blending as in Example 3 was carried out. Then, press vulcanization was carried out at 170° C. for 20 minutes, and then secondary vulcanization was carried out for 24 hours in an oven of 230° C. The obtained vulcanizate was evaluated. The results are shown in Table 2.

EXAMPLE 13

To an autoclave having an internal capacity of 3 l, 1600 g of deionized water, 141 g of t-buthanol, 13 g of ammonium perfluorooctanoate, 19 g of ammonium persulfate, 37 g of $Na_2HPO_4.12H_2O$, 4.1 g of sodium hydroxide and 27 g of EVE were charged, then, a Fe/EDTA aqueous solution was added, nitrogen substitution and deaeration of the system were repeated three times, and then, 160 g of TFE and 8 g of propylene were injected.

The temperature of the autoclave was adjusted to 25° C., and then a catalyst solution was charged at a rate of 10 ml/hr by a feed pump to initiate polymerization. While maintaining the temperature of the autoclave at 25° C., if the pressure decreased to 24.5 kg/cm²G by polymerization, a mixed gas of TFE/propylene=53/47 (mol %) was added to maintain the pressure at 25 kg/cm²G. This procedure was repeated, and the polymerization reaction was carried out for 8 hours. Supply of the catalyst solution was terminated, and the unreacted monomer was purged to terminate the copolymerization reaction.

The obtained formed latex was added to a 10% NaCl aqueous solution and coagulated, and it was further thoroughly washed with water and then dried to obtain 780 g of a copolymer having a specific gravity of 1.55 and a Mooney viscosity [$ML_{1+10}$ (100° C.)] of 110. The copolymer was subjected to elemental analysis and NMR analysis, whereby polymer units based on TFE were 55 mol %, and polymer units based on propylene were 45 mol %.

With respect to copolymer, blending and vulcanization were carried out in the same manner as in Example 6, whereby foaming during the vulcanization was substantial, and it was impossible to obtain a vulcanizate, of which the physical properties could be measured.

EXAMPLE 14

With respect to the copolymer obtained in Example 13, blending and vulcanization were carried out in the same manner as in Example 11, whereby foaming during the vulcanization was substantial, and it was impossible to obtain a vulcanizate, of which the physical properties could be measured.

EXAMPLE 15

To an autoclave having an internal capacity of 3 l, 1600 g of deionized water, 141 g of t-buthanol, 13 g of ammonium perfluorooctanoate, 19 g of ammonium persulfate, 37 g of $Na_2HPO_4.12H_2O$, 1.4 g of sodium hydroxide and 27 g of EVE were charged, then, a Fe/EDTA aqueous solution was added, nitrogen substitution and deaeration of the system were repeated three times, and then, 160 g of TFE and 8 g of HFP were injected.

The temperature of the autoclave was adjusted to 25° C., and then, the catalyst solution was charged at a rate of 10 ml/hr by a feed pump to initiate polymerization. While maintaining the temperature of the autoclave at 25° C., if the pressure decreased to 24.5 kg/cm²G by polymerization, a mixed gas of TFE/HFP=91/9 (mol %) was added to maintain the pressure at 25 kg/cm²G, and 8 g of EVE was added every time when 20 g of this mixed gas monomer was added. This procedure was repeated, and the polymerization reaction was carried out for 8 hours. Supply of the catalyst solution was terminated, and the unreacted monomer was purged to terminate the copolymerization reaction.

The obtained formed latex was added to a 10% NaCl aqueous solution and coagulated, and it was further thoroughly washed with water and then dried to obtain 780 g of a copolymer having a specific gravity of 1.49 and a Mooney viscosity [$ML_{1+10}$ (100° C.)] of 120. The copolymer was subjected to elemental analysis and NMR analysis, whereby polymer units based on TFE were 54 mol %, polymer units based on HFP were 4 mol %, and polymer units based on EVE were 42 mol %.

With respect to copolymer, blending and vulcanization were carried out in the same manner as in Example 6, whereby foaming during the vulcanization was substantial, and it was impossible to obtain a vulcanizate, of which the physical properties could be measured.

EXAMPLE 16

Copolymer 1 was subjected to heat treatment at 290° C. for one hour to obtain copolymer 6 having a specific gravity of 1.52 and a Mooney viscosity [$ML_{1+10}$ (100° C.)] of 100. Copolymer 6 was subjected to infrared analysis, whereby the presence of a double bond was confirmed by absorption at a wave number of 3120 $cm^{-1}$ and 1722 $cm^{-1}$. With respect to copolymer 6, blending was carried out as shown in Table 2, and vulcanization was carried out under the same conditions as in Example 11. The obtained vulcanizate was evaluated. The results are shown in Table 2.

EXAMPLE 17

The formed latex obtained in Example 1 was added to 500 g of a 10% NaOH aqueous solution and coagulated, and 12 g of tetrabutylammonium bromide was added, followed by stirring at 80° C. for 2 hours. Thereafter, it was thoroughly washed with water and then dried to obtain 800 g of a copolymer having a specific gravity of 1.52 and a Mooney viscosity [$ML_{1+10}$ (100° C.)] of 140. The obtained copolymer (hereinafter referred to as copolymer 7) was subjected to elemental analysis and NMR analysis, whereby polymer units based on TFE were 52 mol %, polymer units based on propylene were 43 mol %, and polymer units based on VF were 5 mol %. Copolymer 7 was subjected to infrared analysis, whereby the presence of a double bond was confirmed by absorption at a wave number of 3120 $cm^{-1}$ and 1722 $cm^{-1}$. With respect to copolymer 7, blending was carried out as shown in Table 2, and vulcanization was carried out under the same conditions as in Example 1. The obtained vulcanizate was evaluated. The results are shown in Table 2.

TABLE 1

| | Ex. 1 | Ex. 2 | Ex. 3 | Ex. 4 | Ex. 5 | Ex. 6 | Ex. 7 |
|---|---|---|---|---|---|---|---|
| Copolymer 1 | 100 | | | | | 100 | 100 |
| Copolymer 2 | | 100 | | | | | |
| Copolymer 3 | | | 100 | | | | |
| Copolymer 4 | | | | 100 | | | |
| Copolymer 5 | | | | | 100 | | |
| MT carbon black | 25 | 25 | 25 | 25 | 25 | 25 | 25 |
| Perkadox 14 | 1 | 1 | 1 | 1 | 1 | 1 | 1 |
| TAIC | 3 | 3 | 3 | 3 | 3 | 3 | 3 |
| Kyowamag 150 | 3 | 3 | 3 | 3 | 3 | 3 | 3 |
| Calvit | | | | | | 6 | 6 |
| 40% TBAOH/methanol | 2.5 | 2.5 | 2.5 | 2.5 | 2.5 | | |
| TBAHS | | | | | | 1 | |
| TBPBT | | | | | | | 1.2 |
| Normal physical properties | | | | | | | |
| Hardness | 72 | 72 | 74 | 73 | 68 | 73 | 73 |
| 100% modulus | 61 | 75 | 75 | 78 | 35 | 70 | 65 |
| Tensile strength | 190 | 185 | 135 | 190 | 135 | 200 | 190 |
| Elongation | 250 | 250 | 170 | 240 | 290 | 230 | 240 |
| Compression set | 26 | 25 | 34 | 24 | 49 | 25 | 25 |
| Heat resistance (230° C., 70 hr) | | | | | | | |
| Hardness change | +1 | +2 | +1 | +2 | +1 | +1 | +1 |
| Tensile strength change | −6 | −14 | −5 | −15 | −8 | −5 | −5 |
| Elongation change | −10 | −16 | −5 | −17 | −18 | −9 | −8 |
| Oil resistance (175° C., 70 hr) | | | | | | | |
| Hardness change | −4 | −5 | −2 | −5 | −2 | −4 | −5 |
| Tensile strength change | −15 | −17 | −7 | −18 | −10 | −19 | −11 |
| Elongation change | −19 | −18 | −10 | −16 | −11 | −20 | −10 |
| Volume change | +6 | +9 | +1 | +10 | +5 | +6 | +6 |

TABLE 2

| | Ex. 8 | Ex. 9 | Ex. 10 | Ex. 11 | Ex. 12 | Ex. 16 | Ex. 17 |
|---|---|---|---|---|---|---|---|
| Copolymer 1 | 100 | 100 | 100 | 100 | | | |
| Copolymer 3 | | | | | 100 | | |
| Copolymer 6 | | | | | | 100 | |
| Copolymer 7 | | | | | | | 100 |
| MT carbon black | 25 | 25 | 25 | 25 | 25 | 25 | 25 |
| Perkadox 14 | 1 | 1 | 1 | | | | 1 |
| TAIC | 3 | 3 | 3 | | | | 3 |
| Kyowamag 150 | 3 | 3 | 3 | 3 | 3 | 3 | 3 |
| Calvit | 6 | 6 | 6 | 3 | 6 | 3 | |
| 40% TBAOH/methanol | | | | 6 | 6 | 4 | |
| TBAHS | | 1 | 1 | | | | 1 |
| TBPC | 1.5 | | | | | | |
| Bisphenol AF | | | 0.3 | 2 | 2 | 1.5 | |

TABLE 2-continued

|  | Ex. 8 | Ex. 9 | Ex. 10 | Ex. 11 | Ex. 12 | Ex. 16 | Ex. 17 |
|---|---|---|---|---|---|---|---|
| Normal physical properties | | | | | | | |
| Hardness | 70 | 68 | 74 | 81 | 80 | 78 | 73 |
| 100% modulus | 50 | 45 | 85 | 92 | 85 | 81 | 78 |
| Tensile strength | 175 | 170 | 210 | 150 | 145 | 170 | 200 |
| Elongation | 260 | 280 | 230 | 195 | 190 | 200 | 220 |
| Compression set | 35 | 30 | 21 | 34 | 35 | 32 | 24 |
| Heat resistance (230° C., 70 hr) | | | | | | | |
| Hardness change | +2 | +2 | +2 | +1 | +3 | +2 | +1 |
| Tensile strength change | −10 | −9 | −12 | −21 | −25 | −18 | −9 |
| Elongation change | −15 | −18 | −9 | −23 | −10 | −19 | −12 |
| Oil resistance (175° C., 70 hr) | | | | | | | |
| Hardness change | −6 | −3 | −5 | −4 | −6 | −4 | −5 |
| Tensile strength change | −19 | −12 | −15 | −15 | −18 | −18 | −15 |
| Elongation change | −20 | −15 | −8 | −19 | −20 | −15 | −10 |
| Volume change | +8 | +6 | +8 | +6 | +4 | +6 | +6 |

TABLE 3

| | |
|---|---|
| Calvit: | Calcium hydroxide (manufactured by Ohmi Kagaku K. K.) |
| TBAOH: | Tetrabutylammonium hydroxide |
| TBAHS: | Tetrabutylammonium bisulfate |
| TBPBT: | Tetrabutylphosphonium benzotriazolate |
| TBPC: | Tetrabutylphosphonium chloride |

By vulcanizing the composition containing the fluorine-containing copolymer excellent in vulcanizability, it is possible to obtain a molded product excellent in e.g. heat resistance, oil resistance and chemical resistance.

INDUSTRIAL APPLICABILITY

The vulcanized molded product is very useful based on the excellent vulcanized physical properties in a wide range of applications, such as o-rings, gasket, calking materials, diaphragms, tubes, hoses, for radiators or engines of automobiles, or parts for food plants or chemical plants.

What is claimed is:

1. A fluorine-containing copolymer, which comprises:
   from 30 to 70 mol % of polymer units based on (A) tetrafluoroethylene;
   from 0.1 to 40 mol % of polymer units based on (B) of at least one member selected from the group consisting of vinyl fluoride and chloride; and
   from 20 to 69.9 mol % of polymer units based on (C) a polymerizable compound selected from the group consisting of a fluorine-containing olefin, an alkyl vinyl ether, a hydrocarbon olefin and a fluorine-containing vinyl ether selected from the group consisting of a perfluorovinyl ether having the formula:

$$CF_2=CFO(CF_2CFXO)_nR^f,$$

wherein $R^f$ is a $C_{1-12}$ perfluoroalkyl group, X is a fluorine atom or a trifluoromethyl group and n is 0 or an integer of 1 to 6, a non-perfluorinated vinyl ether having the formula:

$$CF_2=CFO(CF_2)_pH,$$

wherein p is an integer ranging from 2 to 8 and a fluorinated vinyl ether of the formula:

$$CF_2=CFOCH_2(CF_2)_qF,$$

wherein q is an integer ranging from 1 to 7, said copolymer having a Mooney viscosity $ML_{1+10}$ (100° C.) ranging from 10 to 200 as an index of molecular weight of the copolymer.

2. The fluorine-containing copolymer according to claim 1, which comprises from 35 to 65 mol % of polymer units of tetrafluoroethylene (A) from 0.5 to 15 mol % of polymer units based on vinyl fluoride or vinyl chloride (B), and from 30 to 65 mol % of polymer units based on said polymerizable compound (C).

3. The fluorine-containing copolymer according to claim 1, which has a Mooney viscosity $ML_{1+10}$ (100° C.) ranging from 15 to 150.

4. The fluorine-containing copolymer according to claim 1, wherein component (B) is vinyl fluoride.

5. The fluorine-containing copolymer according to claim 1, wherein component (C) is ethylene or propylene.

6. A vulcanizable composition, which comprises:
   a fluorine-containing copolymer as set forth in claim 1, (E) a vulcanizing agent, (F) an acid-receiving agent and (G) a vulcanization accelerator.

7. A molded product prepared by molding the vulcanizable composition as set forth in claim 6.

8. A process for producing a molded product comprising molding the vulcanizable composition of claim 6.

* * * * *